Figure 1:
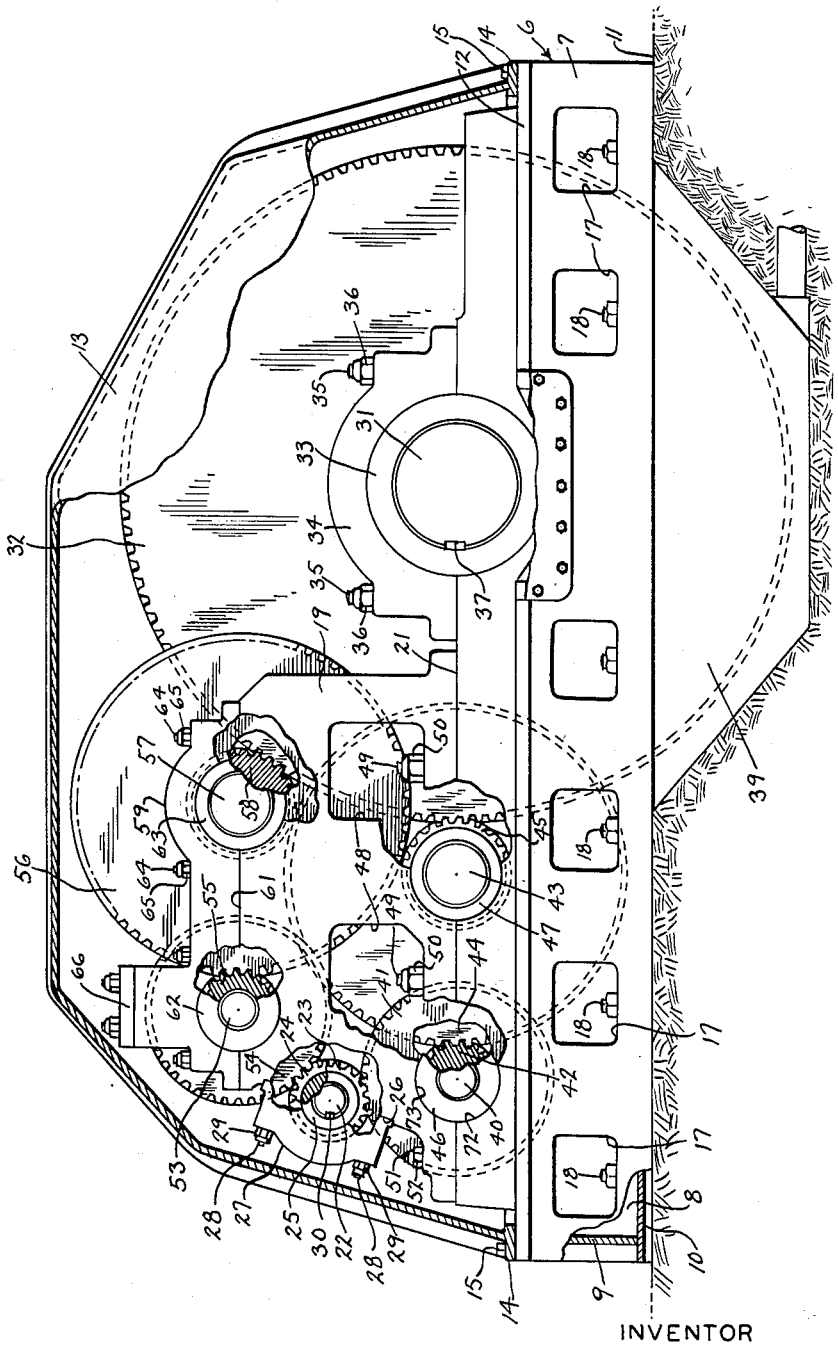

May 19, 1964  R. J. THOMAS  3,133,451
MULTIPLE REDUCTION GEAR UNIT
Filed Dec. 28, 1961  3 Sheets-Sheet 1

INVENTOR
RICHARD J. THOMAS

BY
Thomas W. Ehrmann

ATTORNEY

May 19, 1964

R. J. THOMAS 3,133,451

MULTIPLE REDUCTION GEAR UNIT

Filed Dec. 28, 1961

3 Sheets-Sheet 2

INVENTOR
RICHARD J. THOMAS

BY

Thomas W. Ehrmann

ATTORNEY

May 19, 1964   R. J. THOMAS   3,133,451
MULTIPLE REDUCTION GEAR UNIT
Filed Dec. 28, 1961   3 Sheets-Sheet 3

INVENTOR
RICHARD J. THOMAS

BY
Thomas W. Ehrmann

ATTORNEY

3,133,451
MULTIPLE REDUCTION GEAR UNIT
Richard J. Thomas, Fox Point, Wis., assignor to The Falk Corporation, Milwaukee, Wis., a corporation of Wisconsin
Filed Dec. 28, 1961, Ser. No. 162,694
7 Claims. (Cl. 74—410)

This invention relates to housed speed reducers and resides in a parallel shaft, multiple reduction gear unit comprised of two separate divided load gear trains driven from a common input shaft, each of said gear trains being provided with suitable gearing to accomplish a reduction of input speed in the course of driving a single output shaft, the input and output shafts being spaced horizontally from each other.

Multiple reduction gear units which employ dual gear trains find application wherever it is necessary to provide a heavy duty, low speed drive. In the past, such gear units have often taken the form of concentric shaft units in which the axis of the input shaft is colinear with the axis of the output shaft, and in which the dual gear trains are symmetrically arranged on opposite sides of the concentric input and output shafts. Parallel shaft type gear units have also been employed in which the input and output shafts are disposed in a vertical plane, but such parallel shaft gear units also have had their dual gear trains arranged on opposite sides of such vertical plane.

There are instances, however, where concentric shaft gear units and parallel shaft gear units having symmetrically arranged dual gear trains cannot be advantageously employed because, for example, spatial or dimensional limitations preclude their economical and efficient use. One such instance may be found in the use of a multiple reduction, dual gear train unit as a drive for a cement kiln. Such kilns normally include one or more ring gears which are disposed intermediate the ends of the kiln and which encircle the circumference of the generally cylindrical kiln. Each ring gear is driven by one or two kiln pinions which, in turn, are each driven by a multiple reduction gear unit. To avoid the necessity of right angle turns, the axes of the output shafts of the multiple reduction units should lie parallel to a vertical plane through the longitudinal axis of the kiln. In such an instance, therefore, it is desirable to employ a parallel shaft, multiple reduction gear unit in which the parallel input and output shafts are spaced horizontally so that the output shaft may lie parallel and in close proximity to the kiln and the input shaft may be spaced away from the kiln, to thereby provide the necessary clearance.

It is, therefore, a principal object of this invention to provide a parallel shaft, multiple reduction gear unit employing dual, divided load gear trains, and in which the parallel input and output shafts are spaced horizontally from each other.

A parallel shaft, divided load, multiple reduction gear unit in accordance with this invention, while particularly suited for its intended function, gives rise to a number of problems, hereinafter enumerated, and the preferred construction of the gear unit contains certain advantageous features which solve such problems and contribute substantially to the overall effectiveness and usefulness of the gear unit. Thus, gear units in accordance with this invention preferably employ helical gears throughout, and the use of helical gears creates problems caused by axial thrust forces which act on the helical gear teeth. For example, the output shaft is subjected to an axial thrust force from meshing gears of each of the gear trains and such axial thrust forces are additive since they act in the same direction. In addition, one shaft of one of the pair of gear trains will be subjected to additive axial thrust forces, and the additive axial thrust forces on such shaft as well as the additive axial thrust forces on the output shaft create large, undesirable force moments about the foundation of the unit. In the preferred construction of the gear unit of this invention, the output shaft and the one shaft subjected to additive axial thrust forces are supported at a low elevation relative to the foundation of the unit thereby decreasing the moment arms of such axial thrust forces and reducing the effect of such forces to a practical minimum.

Accordingly, it is another object of this invention to provide a parallel shaft, divided load, multiple reduction gear unit in which undesirable moments produced by axial thrust forces acting about the foundation of the unit are minimal.

For ease of fabrication and assembly, it is most desirable that a gear unit in accordance with this invention have its input and output shafts together with the shafts which comprise the dual gear trains simply supported entirely by a pair of spaced vertical walls. However, it is also desirable that the shafts generally, and the input shaft in particular, be capable of quick and easy removal from their supports. Such speed and simplicity of removal is desirable for servicing or replacement and, when helical gears are employed, for indexing of the gears to insure that meshing helical gears are in phase.

It is, therefore, a further object of this invention to provide a parallel shaft, dual gear train, multiple reduction gear unit in which all shafts are simply supported by a pair of vertical bearing walls and mounted therein for simple and speedy removal. To this end, in the preferred construction the vertical bearing walls are separable along two horizontal planes of cleavage, a lower separable portion being provided to accommodate the output shaft and the shafts of one gear train and an upper separable portion being provided to accommodate the shafts of the other gear train. The input shaft in said preferred construction is supported on an end surface of the bearing walls and is suitably mounted for removal without disturbing the other shafts.

The foregoing and other objects of this invention will appear in the description to follow. In the description, reference is made to the accompanying drawings which form a part hereof and in which there is shown by way of illustration a specific form in which this invention may be practiced. The form described in detail will enable those skilled in the art to practice this invention, but it is to be understood that other embodiments of the invention may be used and that structural changes in the embodiment described may be made by those skilled in the art without departing from the true scope of the present invention. Consequently, the following detailed description is not to be taken in a limiting sense and the scope of the present invention is that which is defined by the appended claims.

Figure 2:
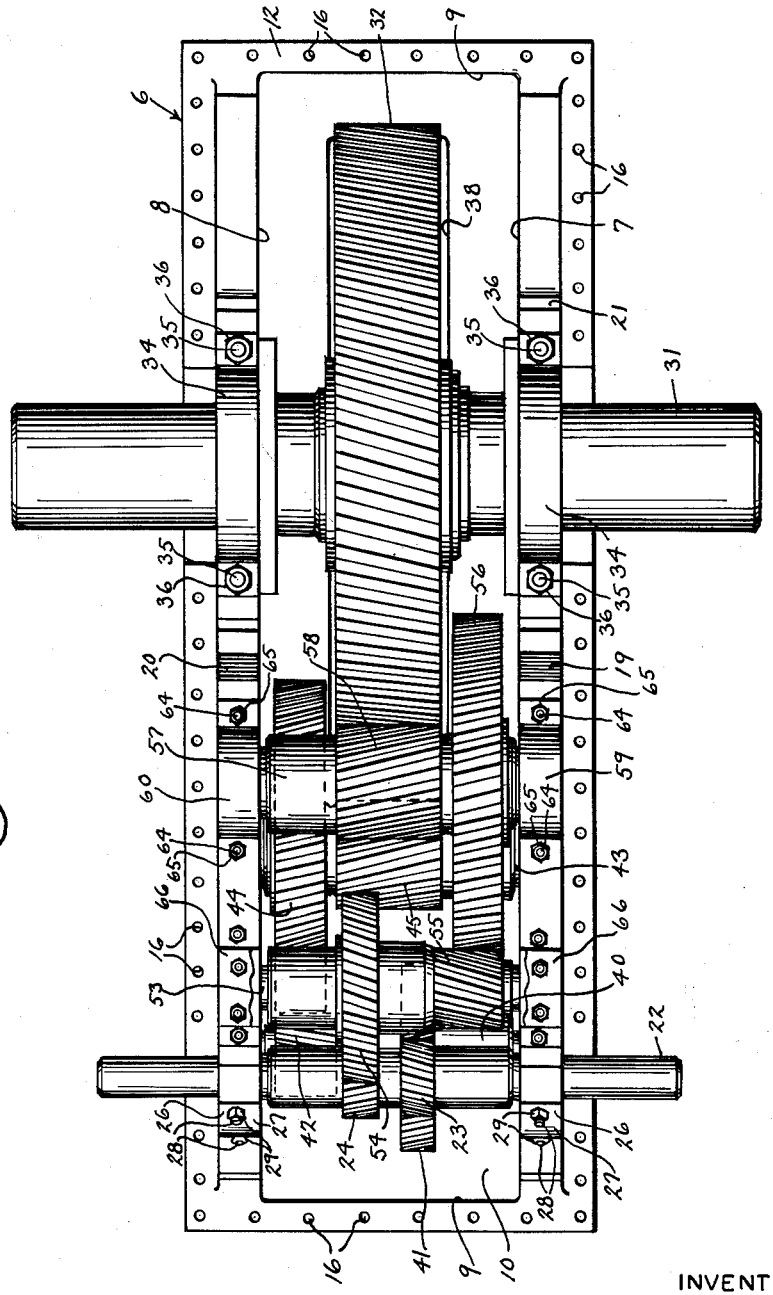
Figure 3:
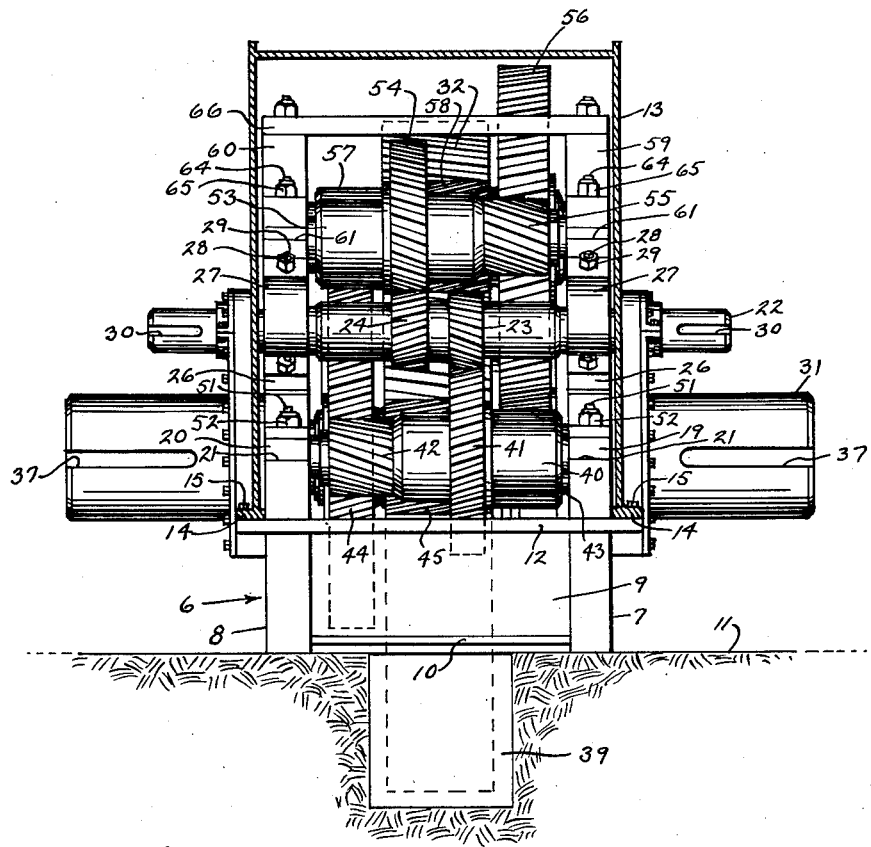
Figure 4:
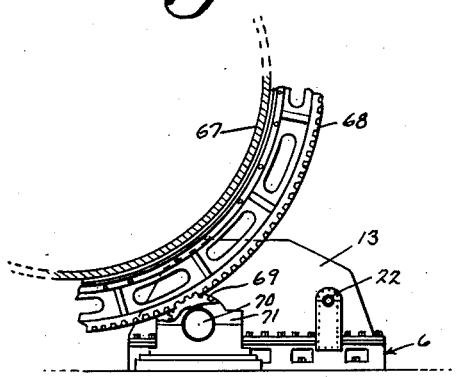

In the drawings:

FIG. 1 is a view in elevation of a gear unit in accordance with this invention with portions broken away for clarity of presentation, FIG. 2 is a plan view of the gear unit with the housing cover removed, FIG. 3 is an end view of the gear unit with the housing cover partially broken away, and FIG. 4 is a generally schematic view showing one contemplated employment of the gear unit of this invention.

Referring to the drawings, a triple reduction gear unit in accordance with this invention includes a base portion designated generally by the numeral 6. The base portion 6 includes a pair of spaced, parallel, heavy section side walls 7 and 8 which form two opposed sides of the base portion 6 and a pair of end plates 9 forming the remaining sides of the base. A bottom plate 10 is also provided adjacent the lower edges of the bearing walls 7 and 8 and the end plates 9. The sides, ends and bottom of the base are securely united as by welding. The base portion 6 is adapted to be supported by a foundation with the side walls 7 and 8 resting upon and secured to the foundation at a baseline designated by the numeral 11. A laterally extending flange 12 is provided along the periphery of the base portion 6 at the level of the top of the end plates 9, and the flange 12 is substantially uninterrupted throughout the entire periphery. The flange 12 is welded to the top surfaces of the end plates 9 and is further welded to the sides of the side walls 7 and 8 to extend outwardly therefrom. A suitable housing cover 13 is provided with a mating peripheral flange 14 extending about its lower portion, and such housing cover 13 is attached to the base portion 6 by a plurality of capscrews 15 which are journalled through spaced holes (not shown) provided in the flange 14 and threaded into oppositely disposed, tapped holes 16 provided in the flange 12. The side walls 7 and 8 are provided with a plurality of pockets 17 formed in the side walls 7 and 8 between the baseline 11 and the flange 12, and such pockets 18 afford access for the installation of anchor bolts 18 to secure the base portion 6 to a foundation.

A pair of similar vertical risers 19 and 20 rest upon the top surfaces of the side walls 7 and 8, respectively. The risers 19 and 20 have a thickness equal to that of the side walls 7 and 8 and act as vertical extensions thereof. The line of demarcation between each of the risers 19 and 20 and the respective side walls 7 and 8 lies in a horizontal plane which defines a lower split 21 of the supporting structure. An input shaft 22 is provided with a pair of helical primary driving pinions 23 and 24 formed integral therewith and having their teeth oppositely inclined. The input shaft 22 is rotatably journalled in suitable straight roller bearings 25, each of which is received between a surface milled into an inclined end wall 26 of the risers 19 and 20 and a pillow block 27 which is secured to the respective end wall 26 of the riser 19 or 20 by a pair of studs 28 extending through the pillow block 27 and threaded in tapped holes provided in the risers 19 and 20 and by locknuts 29 engaging the studs 28. The input shaft 22 is preferably symmetrical and portions thereof extend outwardly beyond the risers 19 and 20 and the cover 13, such extending portions being provided with suitable keyways 30 for connection to a power source (not shown) on either side of the speed reducer.

An output shaft 31, which carries a helical bull gear 32, is rotatably journalled in spherical roller bearings 33 which are received between milled surfaces provided in the tops of the bearing walls 7 and 8 and cooperating pillow blocks 34. The output shaft 31 is spaced horizontally from the input shaft 22 but does not lie in a horizontal plane therewith. Rather, the longitudinal axis of the output shaft 31 lies in the plane of the lower horizontal split 21 and such split 21 forms the cleavage line between the bearing walls 7 and 8 and the pillow blocks 34. The pillow blocks 34 are secured to the top surfaces of the bearing walls 7 and 8 by studs 35 threaded into tapped holes provided in the top surfaces of the bearing walls 7 and 8 and by engaging locknuts 36. The output shaft 31 is symmetrical and includes laterally extending portions which are provided with suitable keyways 37. The bull gear 32 extends below the baseline 11 as shown in FIGS. 1 and 3, an aperture 38 being provided in the bottom plate 10 to receive the bull gear. A pan 39 is attached to the bottom of the base portion and such pan extends into an excavated portion of the foundation to provide an enclosed reservoir for lubricant.

Two separate gear trains are employed, each of which receives one-half of the driving force from the input shaft 22 and which together drive the output shaft 31. The first gear train includes a first intermediate shaft 40 which carries a helical gear 41 in meshing engagement with the primary driving pinion 23, and also carries a helical secondary driving pinion 42. A second intermediate shaft 43 of the first gear train includes a helical gear 44 which meshes with the secondary driving pinion 42, and a helical tertiary driving pinion 45 affixed to the second intermediate shaft 43 meshes with the bull gear 32 to drive the same.

The longitudinal axes of the first intermediate shaft 40 and the second intermediate shaft 43 lie in a lower horizontal plane which includes the axis of the bull gear 32, and which plane corresponds to the lower splits 21. The first intermediate shaft 40 is rotatably journalled in spherical roller bearings 46 restrained between milled portions 72 in the top surfaces of the bearing walls 7 and 8 and cooperating milled portions 73 in the lower surfaces of the risers 19 and 20. Similarly, the second intermediate shaft 43 is rotatably journalled in spherical roller bearings 47 received between milled portions of the bearing walls 7 and 8 and milled portions of the risers 19 and 20. The risers 19 and 20 are provided with cutouts 48 to permit access for the mounting of studs 49 which are journalled through the risers 19 and 20 and threaded into tapped holes provided in the top portion of the bearing walls 7 and 8 and for the mounting of cooperating locknuts 50. Such studs 49 and locknuts 50, together with a similar stud 51 and locknut 52 assembly received in an extending portion adjacent the front or input wall 26 of the risers 19 and 20, effectively secured the risers 19 and 20 to the bearing walls 7 and 8, respectively, and restrain the bearings 46 and 47 therebetween.

A second gear train includes a first intermediate shaft 53 which is provided with a helical gear 54 in meshing engagement with the primary driving pinion 24 and a helical secondary driving pinion 55 which meshes with a helical gear 56 affixed to a second intermediate shaft 57. The second intermediate shaft 57 is similar to the shaft 43 and also includes a tertiary driving pinion 58 which meshes for driving engagement with the bull gear 32.

The longitudinal axes of the first intermediate shaft 53 and of the second intermediate shaft 57 of the second gear train lie in a common horizontal plane which is spaced above the plane of the lower split 21. A pair of cap pieces 59 and 60 are seated upon the upper surfaces of the risers 19 and 20, respectively, and act as extensions thereof. The line of cleavage between the risers 19 and 20 and the cap pieces 59 and 60, respectively, define upper splits 61 of the supporting structure, and such upper splits 61 coincide with the plane of the axes of the shafts 53 and 57. The first intermediate shaft 53 is rotatably journalled in spherical roller bearings 62 which are received in milled portions provided in the risers 19 and 20 and in cooperating milled portions provided in the cap pieces 59 and 60. The second intermediate shaft 57 is similarly journalled in spherical roller bearings 63, which are received between the risers 19 and 20 and the cap pieces 59 and 60, respectively.

The cap pieces 59 and 60 are secured in place upon the risers 19 and 20, respectively, by studs 64 passed through holes in the cap pieces 59 and 60 and threaded into tapped holes provided in the upper portions of the risers 19 and 20 and by cooperating locknuts 65. A pair of studs 64 and locknuts 65 are provided to straddle each of the bearings 62 and 63. A tie bar 66 is affixed to an upwardly extending portion of each of the cap pieces 59 and 60 and such tie bar 66 spans the distance between the cap pieces 59 and 60 to prevent misalignment of bearings due to forces tending to buckle the vertical supporting structure. The tie bar 66 has been removed from FIG. 2 for clarity of presentation, but may be seen in FIGS. 1 and 3.

As seen in FIG. 3, the cover 13 completely encloses the unit above the level of the flanges 12 with the exception of suitable cut out portions provided for the laterally extending ends of the input shaft 22 and of the output shaft 31. The details of construction of the cover 13 form no part of the present invention and any suitable cover may be employed.

From the above description, it will be seen that a gear unit in accordance with this invention includes an input shaft 22 provided with a pair of helical primary driving pinions 23 and 24 having their teeth oppositely inclined and which divide the input load between two separate gear trains. In the embodiment being described, each of the gear trains includes a first intermediate shaft 40 and 53 which carries a helical gear 41 and 54, respectively, meshing with one of the primary driving pinions 23 and 24, respectively, and also carries a secondary driving pinion 42 and 55, respectively. Each gear train further includes a second intermediate shaft 43 and 57 having a helical gear which meshes with a secondary driving pinion 42 and 55, respectively, and a tertiary driving pinion 45 and 58, respectively, which meshes with a bull gear 32 for driving of an output shaft 31 which is spaced horizontally from the input shaft 22. All gearing is simply supported adjacent the ends of the shafts by a pair of parallel, vertical bearing walls each of which comprises a side wall 7 and 8, a riser 19 and 20 and a cap piece 59 and 60.

When employed as a drive for a cement kiln, the gear unit is designed to drive a kiln pinion which meshes with a ring gear encircling the kiln. Referring to FIG. 4, there is shown therein a schematic representation of a cement kiln 67 having a ring gear 68 attached thereto. The ring gear 68 is normally affixed to the kiln 67 at a point intermediate the ends of the kiln. A kiln pinion 69 is affixed to a shaft 70 and meshes with the ring gear 68. The shaft 70 is journalled adjacent each end in suitably supported bearings 71 and is colinear with and coupled to the output shaft 31. The gear unit is preferably positioned close to the meshing ring gear 68 and kiln pinion 69 to avoid excessive lengths of the coupled pinion shaft 70 and output shaft 31. It will be noted that the output shaft 31 will lie generally parallel to the longitudinal axis of the cement kiln. It will be appreciated that if a concentric shaft gear unit or a symmetrical parallel shaft gear unit were employed for such a drive, serious spatial clearance problems would be present due to the symmetrical arrangement of the gear trains about the output shaft, resulting in the output shaft being located centrally of the gear unit housing. However, the gear unit of this invention has its output shaft 31 offset substantially from the center of the gear unit and, when in place, the bulk of the gear unit including the input shaft and both gear trains will lie laterally outwardly from the kiln.

A source of power, generally in the form of an electric motor, may be coupled to the input shaft 22 at one end thereof. If desired, a standby source of power, for example an internal combustion engine, may be releasably coupled to the opposite end to provide a second source in case of failure of the primary source. The straight roller bearings 25 permit the input shaft 22 to float axially to equalize the axial thrust force on each primary driving pinion 23 and 24 so that the load is always divided equally between each gear train. The separate gear trains each perform a triple reduction of one-half of the total load and such reduced speed is transferred to the bull gear 32 to drive the output shaft 31.

Since helical gears are preferably used throughout the gear unit of this invention, axial thrust forces produced by meshing gear teeth are present. The bull gear 31 is subjected to an axial thrust force by both of the tertiary driving pinions 45 and 58 and these axial thrust forces are additive, that is, they both act in the same direction parallel to the axis of the output shaft 31. A total axial thrust force is thereby present which is substantial and which results in an undesirable moment about the top of the foundation. If the gear unit, including the bull gear 32, were supported entirely above the level of the baseline 11, the total axial thrust force on the output shaft 31 would have a considerable moment arm relative to the baseline 11, making necessary a much stronger foundation and substantially heavier anchoring of the gear unit to the foundation than is required for the gear unit of this invention. It is preferable that the lower splits 21 which coincide with the axis of the output shaft 31 be located a distance above the baseline 11 only slightly greater than the outer radius of the helical gear 44 so that the helical gear 44 clears the base plate 10 and, with the exception of the bull gear 32, all gearing is located above the baseline 11. Such an arrangement results in the minimum amount of excavation of the foundation being required, yet provides the benefit of a low level for the axis of the output shaft 31.

Each pinion of the input shaft 22 and each gear and pinion of the two separate gear trains is subjected to a thrust force parallel to the axis of its associated shaft. As noted above, the input shaft 22 will be provided with equal and opposite axial thrust forces by the dynamic gear tooth loads placed upon the primary driving pinions 23 and 24. Similarly, the shafts which comprise the dual gear trains will, with one exception, be provided with axial thrust forces that act in opposite directions and such forces tend to compensate for each other. The one exception is the first intermediate shaft 40. The shaft 40 is subjected to an axial thrust force on the teeth of its helical gear 41 and an axial thrust force on the teeth of its secondary driving pinion 42 which act in the same direction parallel to the axis of the shaft 40. The shaft 40 is thus subjected to additive axial thrust forces and this results in a substantial total force. It is, therefore, desirable to place the axis of the shaft 40 at a low elevation relative to the baseline 11 and this is accomplished by supporting the shaft 40, together with the shaft 43, in the plane of the lower split 21.

For proper meshing of the helical gears and pinions, it is necessary that one of the dual gear trains contain an intermediate shaft whose helical gear and pinion have their teeth inclined in opposite directions. In the gear unit being described, the teeth of the helical gear 41 and secondary driving pinion 42 of the lower first intermediate shaft 40 are oppositely inclined. The remaining intermediate shafts 43, 53 and 57 each have the teeth of their respective helical gear and pinion inclined in the same direction. It is the opposite inclination of the teeth of helical gears affixed to the same intermediate shaft which gives rise to the additive axial thrust forces referred to above. Therefore, the gear train which includes such an intermediate shaft should be supported, according to this invention, at the lower splits 21.

For ease of construction and assembly, the gear train which does not include an intermediate shaft subjected to additive axial thrust forces has the axes of its shafts in a horizontal plane spaced above the lower plane and which, as indicated above, coincides with the upper splits 61. The input ends 26 of the risers 19 and 20 are provided with inclined milled surfaces as shown in FIG. 1 and such milled surfaces are preferably parallel to a line through the axes of the first intermediate shafts 40 and 53 for maximum resistance of the pillow block 27 against the tooth reaction forces to which the input shaft 22 is subjected. The input shaft 22 is mounted partially exterior of the risers 19 and 20 of the input ends 26 to facilitate simple removal of the input shaft 22 for servicing, replacement, or indexing of the helical gears of the unit. At the time of initial assembly of the gear unit, or when an intermediate shaft is removed for servicing or replacement, it is necessary to index the gear unit so that all meshing gears are in phase. If the gear unit is not properly indexed, the input shaft 22, when placed in its bearing seat between the risers 19 and 20 and the pillow blocks 27, will mesh with the helical gears 41 and 54 but the primary driving pinions 23 and 24 will not be aligned axially for complete mating across their entire faces with the helical gears 41 and 54, respectively. Proper indexing is accomplished by removing the input shaft 22 and the upper first intermediate shaft 53 and rotating the first intermediate shaft 53 a predetermined amount. Under extreme circumstances, it may also be necessary to remove the second intermediate shaft 57 to accomplish the indexing. It will be noted that the gear unit of this invention is particularly adapted to ease of indexing since the input shaft 22 and the upper gear train shafts 53 and 57 are removable without disturbing the remaining gearing.

The input shaft 22 and the output shaft 31 are symmetrical about their supports, and the position of the helical gear and driving pinion on each pair of intermediate shafts is the same relative to the supports for the shafts. Thus, each of the pairs of first and second intermediate shafts are symmetrical relative to the bearing walls and this results in the ability to remount all shafts end for end after wear so that forces are directed against the unworn tooth contact surfaces, thereby greatly extending the useful life of the gear unit. In addition, the two second intermediate shafts 43 and 57 together with their associated gearing are identical and may be interchanged.

The input shaft 22 is supported in bearings 25 which are spaced relatively far apart. The input shaft 22 will be subjected to tipping within the bearings 25 due to necessary clearance in the bearings 25. In the relatively long input shaft 22, however, such tipping is minimized due to the long span, and therefore, the displacement of the primary driving pinions 23 and 24 is at a minimum and does not adversely affect the meshing of the primary driving pinions 23 and 24 with the helical gears 41 and 54, respectively.

While the present invention has been illustrated and described as incorporating a triple reduction gear unit, it will be appreciated that the gear unit may be provided with suitable divided load gear trains to accomplish a reduction in input speed other than a triple reduction.

I claim:

1. A multiple reduction gear unit comprising: an input shaft having a pair of driving pinions; an output shaft parallel to said input shaft and spaced horizontally therefrom, said output shaft being provided with a bull gear; a plurality of intermediate shafts each parallel to said input and output shafts and comprising two separate gear trains, said intermediate shafts each being provided with meshing gears, each of said gear trains being adapted to be driven by one of said pair of driving pinions and to drive the output shaft by meshing engagement with the bull gear; and a pair of parallel, vertical bearing walls each providing journal support for each of said input shaft, said output shaft and said intermediate shafts, the output shaft and the intermediate shafts comprising one of said gear trains being supported by said bearing walls in a lower horizontal plane, the intermediate shafts comprising the other of said gear trains being supported by said bearing walls in a horizontal plane above said lower plane, and said input shaft being supported at the input end of said bearing walls at a level between said horizontal planes.

2. A multiple reduction gear unit comprising: an input shaft having a pair of driving pinions; an output shaft parallel to and spaced horizontally from said input shaft and having a bull gear; a plurality of intermediate shafts comprising two separate gear trains, said intermediate shafts each being provided with meshing gears, each of said gear trains being adapted to be driven by one of said pair of driving pinions and to drive the output shaft by meshing engagement with the bull gear; and a pair of parallel bearing walls rising vertically from a base of the unit and supporting each of said input shaft, said output shaft and said intermediate shafts in parallel relation with each other, the output shaft and the intermediate shafts comprising one of said gear trains being supported by said bearing walls in a horizontal plane at a low elevation relative to the base of the unit which is less than the maximum radius of the bull gear, the intermediate shafts comprising the other of said gear trains being supported by said bearing walls in a horizontal plane spaced above said first mentioned plane, and said input shaft being supported at the input end of said bearing walls at a level between said horizontal planes.

3. A multiple reduction gear unit comprising: an input shaft having a pair of driving pinions; an output shaft parallel to and spaced horizontally from said input shaft and having a bull gear; a plurality of intermediate shafts each having meshing gears and comprising two separate gear trains each adapted to be driven by one of said pair of driving pinions and to drive the output shaft by meshing engagement with said bull gear, each of said gear trains including a final intermediate shaft having a driven gear and a final driving pinion meshing with said bull gear; and a housing including a base portion having a pair of parallel, vertical bearing walls extending upwardly from a bottom of said base portion and supporting each of said input shaft, said output shaft and said intermediate shafts in parallel relation with each other, the output shaft and the intermediate shafts comprising one of said gear trains being supported by said bearing walls in a horizontal plane at an elevation relative to the bottom of said base portion which slightly exceeds the maximum radius of said driven gear, the intermediate shafts comprising the other of said gear trains being supported by said bearing walls in a horizontal plane spaced above said first mentioned plane, and said input shaft being supported at the input end of said bearing walls at a level between said horizontal planes.

4. A parallel shaft, multiple reduction gear unit comprising: an input shaft having a pair of driving pinions; an output shaft parallel to and spaced horizontally from said input shaft and having a bull gear; intermediate shafts comprising two separate gear trains, said intermediate shafts each being provided with meshing gears, each of said gear trains being adapted to be driven by one of said pair of driving pinions and to drive said output shaft by meshing engagement with said bull gear; and a pair of parallel, vertical bearing walls extending upwardly from a base of the unit and each comprising a side wall, a riser disposed upon said side wall and a cap piece disposed upon said riser, the junction between said side wall and riser defining a lower horizontal split and the junction between said riser and said cap piece defining an upper horizontal split, said output shaft and the intermediate shafts comprising one of said gear trains being received in bearings supported by said bearing walls at the lower horizontal split, the intermediate shafts which comprise the other of said gear trains being received in bearings supported by said bearing walls at the upper horizontal split, and said input shaft being journaled in bearings supported along the input end of said risers.

5. A parallel shaft, multiple reduction gear unit comprising: an input shaft having a pair of helical primary driving pinions with their teeth oppositely inclined; an output shaft parallel to and spaced horizontally from said input shaft and having a helical bull gear; a plurality of intermediate shafts each provided with a helical driven gear and a helical driving pinion and comprising two separate gear trains, each of said gear trains being adapted to be driven by one of said pair of primary driving pinions and to drive the output shaft by meshing engagement with said bull gear, one of said intermediate shafts having the teeth of its helical driven gear and helical driving pinion oppositely inclined whereby said one intermediate shaft is subjected to additive axial thrust forces; and a pair of parallel bearing walls supporting said shafts and extending vertically upward from a base of the unit, said output shaft and the shafts of the gear train which includes said one intermediate shaft being supported by said bearing walls in a low horizontal plane relative to the base of the unit, the intermediate shafts which comprise the other of said gear trains being supported by said walls in a higher horizontal plane relative to the base of the unit, and said input shaft being supported at the input end of said bearing walls at a level between said horizontal planes.

6. A parallel shaft, multiple reduction gear unit comprising: an input shaft having a pair of helical primary driving pinions with their teeth oppositely inclined, an output shaft parallel to and spaced horizontally from said input shaft and having a helical bull gear; intermediate shafts comprising two separate gear trains and including a pair of first intermediate shafts each provided with a helical gear meshing with one of said primary driving pinions and a helical secondary driving pinion, and a pair of second intermediate shafts each provided with a helical gear meshing with one of said secondary driving pinions and a tertiary helical driving pinion in meshing engagement with said bull gear for driving said output shaft, one of said first intermediate shafts having the teeth of its gearing oppositely inclined whereby said one intermediate shaft is subjected to additive axial thrust forces; and a pair of parallel bearing walls supporting said shafts and extending vertically upward from a base of the unit, said output shaft and the intermediate shafts of the gear train which includes said one first intermediate shaft being supported by said walls in a low horizontal plane relative to the base of the unit, the intermediate shafts which comprise the other of said gear trains being supported by said walls in a higher horizontal plane, and said input shaft being supported at the input end of said bearing walls at a level between said horizontal planes.

7. A parallel shaft, multiple reduction gear unit comprising: an input shaft having a pair of helical primary driving pinions with their teeth oppositely inclined; an output shaft parallel to and spaced horizontally from said input shaft and having a helical bull gear; intermediate shafts comprising two separate gear trains and including a pair of first intermediate shafts each provided with a helical gear meshing with one of said pair of primary driving pinions and a helical secondary pinion, and a pair of second intermediate shafts each provided with a helical gear meshing with one of said secondary driving pinions and a tertiary helical driving pinion in meshing engagement with said bull gear for driving said output shaft; and a pair of spaced bearing walls extending upwardly from a bottom of the unit and each comprising a side wall, a riser disposed upon said side wall and a cap piece disposed upon said riser, the junction between said side wall and riser defining a lower horizontal split and the junction between said riser and said cap piece defining an upper horizontal split, said bull gear and said one first and its meshing second intermediate shafts being received in bearings supported by said bearing walls at the lower horizontal splits and the other first and second intermediate shafts being received in bearings supported by said bearing walls at the upper horizontal split, and said input shaft being journaled in bearings supported by said bearing walls along the input end of said risers.

References Cited in the file of this patent

UNITED STATES PATENTS

| | | |
|---|---|---|
| 1,014,628 | Lieber | Jan. 9, 1912 |
| 2,536,549 | Hindmarch | Jan. 2, 1951 |
| 2,712,761 | Chung | July 12, 1955 |
| 2,911,845 | North | Nov. 10, 1959 |